(12) United States Patent
Harvell

(10) Patent No.: US 12,489,734 B2
(45) Date of Patent: *Dec. 2, 2025

(54) MEDIATED TRAFFIC CONTROL THROUGH MID-LINK SERVER

(71) Applicant: Netskope, Inc., Santa Clara, CA (US)

(72) Inventor: Bradley B. Harvell, Gilbert, AZ (US)

(73) Assignee: Netskope, Inc., Santa Clara, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 18/676,099

(22) Filed: May 28, 2024

(65) Prior Publication Data

US 2024/0396873 A1 Nov. 28, 2024

Related U.S. Application Data

(63) Continuation of application No. 17/318,955, filed on May 12, 2021, now Pat. No. 11,997,071, which is a
(Continued)

(51) Int. Cl.
*H04L 29/06* (2006.01)
*H04L 9/40* (2022.01)

(52) U.S. Cl.
CPC ...... *H04L 63/0263* (2013.01); *H04L 63/0272* (2013.01); *H04L 63/029* (2013.01); *H04L 63/1425* (2013.01); *H04L 63/20* (2013.01)

(58) Field of Classification Search
CPC ............. H04L 63/0263; H04L 63/0272; H04L 63/029; H04L 63/1425; H04L 63/20
See application file for complete search history.

(56) References Cited

U.S. PATENT DOCUMENTS

| 5,440,723 A | 8/1995 | Arnold et al. |
| 6,513,122 B1 | 1/2003 | Magdych et al. |

(Continued)

FOREIGN PATENT DOCUMENTS

| EP | 1063833 A2 | 12/2000 |
| EP | 2965218 A2 | 1/2016 |

OTHER PUBLICATIONS

Sapio et al., "MAPPER: A Mobile Application Personal Policy Enforcement Router for Enterprise Networks", pp. 1-2, retrieved online via: chrome-extension://efaidnbmnnnibpcajpcglclefindmkaj/ https://web.archive.org/web/20150906071927id_/http://rio.ecs.umass. edu:80/~yliao/pmwiki/uploads/Research/Publication/EWSDN14_ demo_MAPPER.pdf, on Jul. 2, 2024.
(Continued)

*Primary Examiner* — Noura Zoubair
(74) *Attorney, Agent, or Firm* — MUGHAL GAUDRY & FRANKLIN PC

(57) ABSTRACT

A controlled content system for providing a controlled and contained environment that is remotely accessible is disclosed. A third-party application on the end user device is modified to allow certain sites and services to be mediated in a mid-link server. The app uses policies to know when to access the mid-link server for the controlled and contained environment. Policies can specify the type of processing performed on the mid-link server. Some embodiments support the app selectively using the mid-link server for mediated sites and services. A mediation switch of a mediated program of the third-party application determines whether the network packet traffic is mediated through a mid-link server using the policy cache. The mediation switch includes algorithms that determines the mediated network packet traffic based on one or more parameters.

17 Claims, 11 Drawing Sheets

Related U.S. Application Data continuation of application No. 17/028,696, filed on Sep. 22, 2020, now Pat. No. 11,019,031.

(56) References Cited

U.S. PATENT DOCUMENTS

| | | |
|---|---|---|
| 6,622,248 B1 | 9/2003 | Hirai |
| 7,080,408 B1 | 7/2006 | Pak et al. |
| 7,298,864 B2 | 11/2007 | Jones |
| 7,376,719 B1 | 5/2008 | Shafer et al. |
| 7,735,116 B1 | 6/2010 | Gauvin |
| 7,966,654 B2 | 6/2011 | Crawford |
| 8,000,329 B2 | 8/2011 | Fendick et al. |
| 8,146,133 B2 | 3/2012 | Moon et al. |
| 8,296,178 B2 | 10/2012 | Hudis et al. |
| 8,793,151 B2 | 7/2014 | DelZoppo et al. |
| 8,825,109 B2 | 9/2014 | Montemurro et al. |
| 8,839,417 B1 | 9/2014 | Jordan |
| 8,935,384 B2 | 1/2015 | Goldschlag et al. |
| 9,197,601 B2 | 11/2015 | Pasdar |
| 9,225,734 B1 | 12/2015 | Hastings |
| 9,231,968 B2 | 1/2016 | Fang et al. |
| 9,280,678 B2 | 3/2016 | Redberg |
| 9,811,662 B2 | 11/2017 | Sharpe et al. |
| 9,847,946 B2 | 12/2017 | Aoki |
| 10,084,825 B1 | 9/2018 | Xu |
| 10,237,282 B2 | 3/2019 | Nelson et al. |
| 10,334,442 B2 | 6/2019 | Vaughn et al. |
| 10,382,468 B2 | 8/2019 | Dods |
| 10,484,334 B1 | 11/2019 | Lee et al. |
| 10,771,435 B2 | 9/2020 | Goldschlag et al. |
| 10,826,941 B2 | 11/2020 | Jain et al. |
| 11,032,301 B2 | 6/2021 | Mandrychenko et al. |
| 11,036,856 B2 | 6/2021 | Graun et al. |
| 11,281,775 B2 | 3/2022 | Burdett et al. |
| 11,329,958 B2 | 5/2022 | Tarnavsky et al. |
| 11,677,788 B1 | 6/2023 | Badana et al. |
| 2002/0099666 A1 | 7/2002 | Dryer et al. |
| 2003/0055994 A1 | 3/2003 | Herrmann et al. |
| 2003/0063321 A1 | 4/2003 | Inoue et al. |
| 2003/0172292 A1 | 9/2003 | Judge |
| 2003/0204632 A1 | 10/2003 | Willebeek-LeMair et al. |
| 2004/0015719 A1 | 1/2004 | Lee et al. |
| 2005/0010593 A1 | 1/2005 | Fellenstein et al. |
| 2005/0271246 A1 | 12/2005 | Sharma et al. |
| 2006/0156401 A1 | 7/2006 | Newstadt et al. |
| 2007/0204018 A1 | 8/2007 | Chandra et al. |
| 2007/0237147 A1 | 10/2007 | Quinn et al. |
| 2008/0069480 A1 | 3/2008 | Aarabi et al. |
| 2008/0134332 A1 | 6/2008 | Keohane et al. |
| 2009/0144818 A1 | 6/2009 | Kumar et al. |
| 2009/0150565 A1 | 6/2009 | Grossner et al. |
| 2009/0249470 A1 | 10/2009 | Litvin et al. |
| 2009/0300351 A1 | 12/2009 | Lei et al. |
| 2010/0017436 A1 | 1/2010 | Wolge |
| 2011/0119481 A1 | 5/2011 | Auradkar et al. |
| 2011/0145594 A1 | 6/2011 | Jho et al. |
| 2012/0278896 A1 | 11/2012 | Fang et al. |
| 2012/0304310 A1* | 11/2012 | Blaisdell .............. G06F 21/52 726/28 |
| 2013/0159694 A1 | 6/2013 | Chiueh et al. |
| 2013/0298190 A1 | 11/2013 | Sikka et al. |
| 2013/0347085 A1 | 12/2013 | Hawthorn et al. |
| 2014/0013112 A1 | 1/2014 | Cidon et al. |
| 2014/0068030 A1 | 3/2014 | Chambers et al. |
| 2014/0068705 A1 | 3/2014 | Chambers et al. |
| 2014/0095724 A1 | 4/2014 | Yoakum et al. |
| 2014/0259093 A1 | 9/2014 | Narayanaswamy et al. |
| 2014/0282843 A1 | 9/2014 | Buruganahalli et al. |
| 2014/0359282 A1 | 12/2014 | Shikfa et al. |
| 2014/0366079 A1 | 12/2014 | Pasdar |
| 2015/0100357 A1 | 4/2015 | Seese et al. |
| 2015/0249606 A1 | 9/2015 | Reddy et al. |
| 2016/0323318 A1 | 11/2016 | Terrill et al. |
| 2016/0350145 A1 | 12/2016 | Botzer et al. |
| 2017/0054760 A1* | 2/2017 | Barton .............. H04L 63/0815 |
| 2017/0064005 A1 | 3/2017 | Lee |
| 2017/0093917 A1 | 3/2017 | Chandra et al. |
| 2017/0192763 A9* | 7/2017 | Walker .............. G06F 8/71 |
| 2017/0250951 A1 | 8/2017 | Wang et al. |
| 2017/0331859 A1* | 11/2017 | Bansal .............. H04L 63/029 |
| 2017/0353437 A1 | 12/2017 | Ayyadevara et al. |
| 2018/0331957 A1 | 11/2018 | Ardeli et al. |
| 2020/0050686 A1 | 2/2020 | Kamalapuram et al. |
| 2020/0322230 A1 | 10/2020 | Natal et al. |
| 2020/0396164 A1 | 12/2020 | Arimanda et al. |
| 2021/0185016 A1 | 6/2021 | Ronin et al. |
| 2021/0234898 A1 | 7/2021 | Desai et al. |
| 2022/0224637 A1 | 7/2022 | S et al. |
| 2023/0073086 A1 | 3/2023 | Kaushik et al. |
| 2023/0091527 A1 | 3/2023 | Sapp et al. |
| 2023/0198944 A1 | 6/2023 | Warburton et al. |
| 2023/0396585 A1 | 12/2023 | Wu et al. |

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

Huckaby, Jeff Ending Clear Text Protocols, Rackaid.com, Dec. 9, 2008, 3 pgs.

Nevvton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

Mccullagh, Declan, "How safe is instant messaging? A security and privacy survey," CNET, Jun. 9, 2008, 14 pgs.

Beck et al. "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54.

Zetter, Kim, "Revealed: The Internet's Biggest Security Hole," Wired, Aug. 26, 2008, 13 pgs.

Adya et al., Farsite: Federated, available, and reliable storage for an incompletely trusted environment, SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al., Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~:text=mode of communication.-,What are the different email protocols%3F,and also has defined functions.

Niit, Special Edition Using Storage Area Networks, Que, 2002, 6 pgs.

Chapple, Mike, "Firewall redundancy: Deployment scenarios and benefits," Tech Target, 2005, 5 pgs. available at https://www.techtarget.com/searchsecurity/tip/Firewall-redundancy-Deployment-scenarios-and-benefits?%20Offer=abt_pubpro_AI-Insider.

(56) References Cited

OTHER PUBLICATIONS

Fortinet, FortiGate—3600 User Manual (vol. 1, Version 2.50 MR2) Sep. 5, 2003, 329 pgs.
Fortinet, FortiGate SOHO and SMB Configuration Example, (Version 3.0 MR5), Aug. 24, 2007, 54 pgs.
Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.
Fortinet,FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/%2010.1007/978-3-319-61863-0_5.
Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al. "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P 2000, May 2000, pp. 44-55.
Dean, Tamara, Guide to Telecommunications Technology, Course Technology, 2003, 5 pgs.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management For Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.

* cited by examiner

MEDIATED TRAFFIC CONTROL THROUGH MID-LINK SERVER

PRIORITY

This application is a continuation of U.S. application Ser. No. 17/318,955 entitled "REMOTE ACCESS TO MEDIATED CONTENT CONNECTION AND CONTROL," filed on May 12, 2021, now U.S. Pat. No. 11,997,071, issued May 28, 2024, which is a continuation of U.S. application Ser. No. 17/028,696 entitled "CLIENT SOFTWARE CONNECTION INSPECTION AND ACCESS CONTROL," filed on Sep. 22, 2020, now U.S. Pat. No. 11,019,031, issued May 25, 2021, the contents of which is incorporated by reference in its entirety for all purposes.

BACKGROUND

This disclosure relates in general to remote access to networks with security and, but not by way of limitation, to remote access to a mediated content connection amongst other things.

The modern trend is to have a distributed work force or even have employees work at home. Within the enterprise, security is easier to enforce with everyone being co-located on the same local area network (LAN). As employees connect to services and sites from outside the LAN, security and control is more difficult to maintain.

There are reasons for employees to access certain web sites. However, there may be certain interaction with those sites that is not appropriate. For example, someone in marketing may need to post a video with information on company products, but commenting on that video may not be appropriate. Mediating web sites is difficult to do with user owned devices such as cell phones and tablets.

There is technology to redirect users to filtered or mediated versions a web site. Although providing a certain level of corporate control, it is awkward to see redirected URLs in a browser for example. Where there is a local application that provides this filtration or mediation, users can disable the application to avoid the filtration or modification of inappropriate interaction.

SUMMARY

In one embodiment, the present disclosure provides a controlled and contained environment that is remotely accessible. A controlled content system for providing a controlled and contained environment that is remotely accessible is disclosed. A third-party application on the end user device is modified to allow certain sites and services to be mediated in a mid-link server. The app uses policies to know when to access the mid-link server for the controlled and contained environment. Policies can specify the type of processing performed on the mid-link server. Some embodiments support the app selectively using the mid-link server for mediated sites and services. A mediation switch of a mediated program of the third-party application determines whether the network packet traffic is mediated through a mid-link server using the policy cache. The mediation switch includes algorithms that determines the mediated network packet traffic based on one or more parameters.

In another embodiment, a controlled content system for providing policy-controlled communication over the Internet between a plurality of remote services and a third-party application executing on a client device is disclosed. The controlled content system includes the third-party application, and a mid-link server. The third-party application is configured to execute on the client device. The third-party application includes a first policy component, a client endpoint, an interceptor component, a policy cache, a mediated program and a mediated switch. The first policy component has a first plurality of policies for network packet traffic for the third-party application. The first plurality of policies specify one or more aspects of processing of network sessions from the third-party application to the plurality of remote services. The client endpoint is coupled to a digitally protected tunnel. The interceptor component identifies the network packet traffic according to the first plurality of policies. The network packet traffic is diverted to the client endpoint for transport over the digitally protected tunnel. The policy cache stores the first plurality of policies. The first plurality of policies modifies software operation for a wrapper in real time according to any updates to the first plurality of policies. The mediated program that applies a set of policies on the network packet traffic. The set of policies include the first plurality of policies and a second plurality of policies. The mediation switch of the mediated program determines whether the network packet traffic is mediated through a mid-link server using the policy cache, and the mediation switch includes algorithms that determines the network packet traffic mediated through the mid-link server based on one or more parameters. The mid-link server is coupled to the digitally protected tunnel, and includes a mid-link endpoint, a second policy component, a router component, and an inspection component. The mid-link endpoint that terminates the digitally protected tunnel. The second policy component uses the second plurality of policies to specify at least: policy-based routing, packet re-addressing, and content mediation rules on the network packet traffic identified by the first plurality of policies. The network packet traffic arriving from the digitally protected tunnel. The router component is interposed between the digitally protected tunnel and the plurality of remote services. The router component operates to route network packet traffic between the digitally protected tunnel and the plurality of remote services via a route specified by the second plurality of policies. The inspection component analyzes network packet traffic in accordance with the second plurality of policies. The third-party application operates with the plurality of remote services to provide functionality to the client device.

In yet embodiment, a method for providing policy-controlled communication over the Internet between a plurality of remote services and a third-party application executing on a client device is disclosed. The third-party application is configured to execute on the client device. The third-party application is comprised of a first policy component, a client endpoint, a mediated program, an interceptor component, a policy cache, and a mediated switch. One or more aspects of processing of network sessions from the third-party application to the plurality of remote services according to a first plurality of policies are specified for the network packet traffic for the first policy component of the third-party application. The first plurality of policies are used to identify packet traffic with an interceptor component. The network packet traffic is diverted to the client endpoint for transport over a digitally protected tunnel. The policy cache stores the first plurality of policies. The first plurality of policies modifies software operation for a wrapper in real time according to any updates to the first plurality of policies. The mediated program applies a set of policies on the network packet traffic. The set of policies include the first plurality of policies and a second plurality of policies. The mediation switch of the mediated program determines whether the network packet traffic is mediated through the mid-link server using the policy cache, and the mediation switch includes algorithms that determines the network packet traffic mediated through the mid-link server based on one or more parameters. The mid-link server is coupled to the digitally protected tunnel. The mid-link server includes a mid-link endpoint, a second policy component, a router component, and an inspection component. The digitally protected tunnel is terminated with the mid-link endpoint. The second policy component according to a second plurality of policies specifies at least: policy-based routing, packet re-addressing, and content mediation rules on the network packet traffic identified by the first plurality of policies. The network packet traffic arriving from the digitally protected tunnel. The router component interposed between the digitally protected tunnel and the plurality of remote services routes network packet traffic between the digitally protected tunnel and the plurality of remote services via a route specified by the second plurality of policies. The inspection component in accordance with the second plurality of policies analyzes the network packet traffic. The third-party application operates with the plurality of remote services to provide functionality to the client device.

In still another embodiment, a controlled content system for providing policy-controlled communication over the Internet between a plurality of remote services and a third-party application executing on a client device is disclosed. The controlled content system comprising a plurality of processors and memories with code for: configuring the third-party application to execute on the client device, wherein the third-party application comprises a first policy component, a client endpoint, a mediated program, a policy cache, and a mediated switch, and an interceptor component; specifying one or more aspects of processing of network sessions from the third-party application to the plurality of remote services according to a first plurality of policies for network packet traffic for the first policy component of the third-party application; identifying with an interceptor component packet traffic according to the first plurality of policies, wherein the network packet traffic is diverted to the client endpoint for transport over a digitally protected tunnel; storing the first plurality of policies by the policy cache; modifying software operation for a wrapper in real time according to any updates to the first plurality of policies; applying a set of policies by the mediated program of the third-party application on the network packet traffic, wherein the set of policies include the first plurality of policies and a second plurality of policies; determining by the mediation switch of the mediated program whether the network packet traffic is mediated through a mid-link server using the policy cache, and the mediation switch includes algorithms that determines the network packet traffic mediated through the mid-link server based on one or more parameters; coupling a mid-link server to the digitally protected tunnel, wherein the mid-link server comprises a mid-link endpoint, a second policy component, a router component, and an inspection component; terminating the digitally protected tunnel with the mid-link endpoint; specifying at least: policy-based routing, packet re-addressing, and content mediation rules on the network packet traffic identified by the first plurality of policies. The network packet traffic arriving from the digitally protected tunnel, with the second policy component according to a second plurality of policies; applying by the mediated program of the third-party application, the first plurality of policies and the second plurality of policies on the network packet traffic; routing, with the router component interposed between the digitally protected tunnel and the plurality of remote services, the network packet traffic between the digitally protected tunnel and the plurality of remote services via a route specified by the second plurality of policies; and analyzing the network packet traffic with the inspection component in accordance with the second plurality of policies, wherein the third-party application operates with the plurality of remote services to provide functionality to the client device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
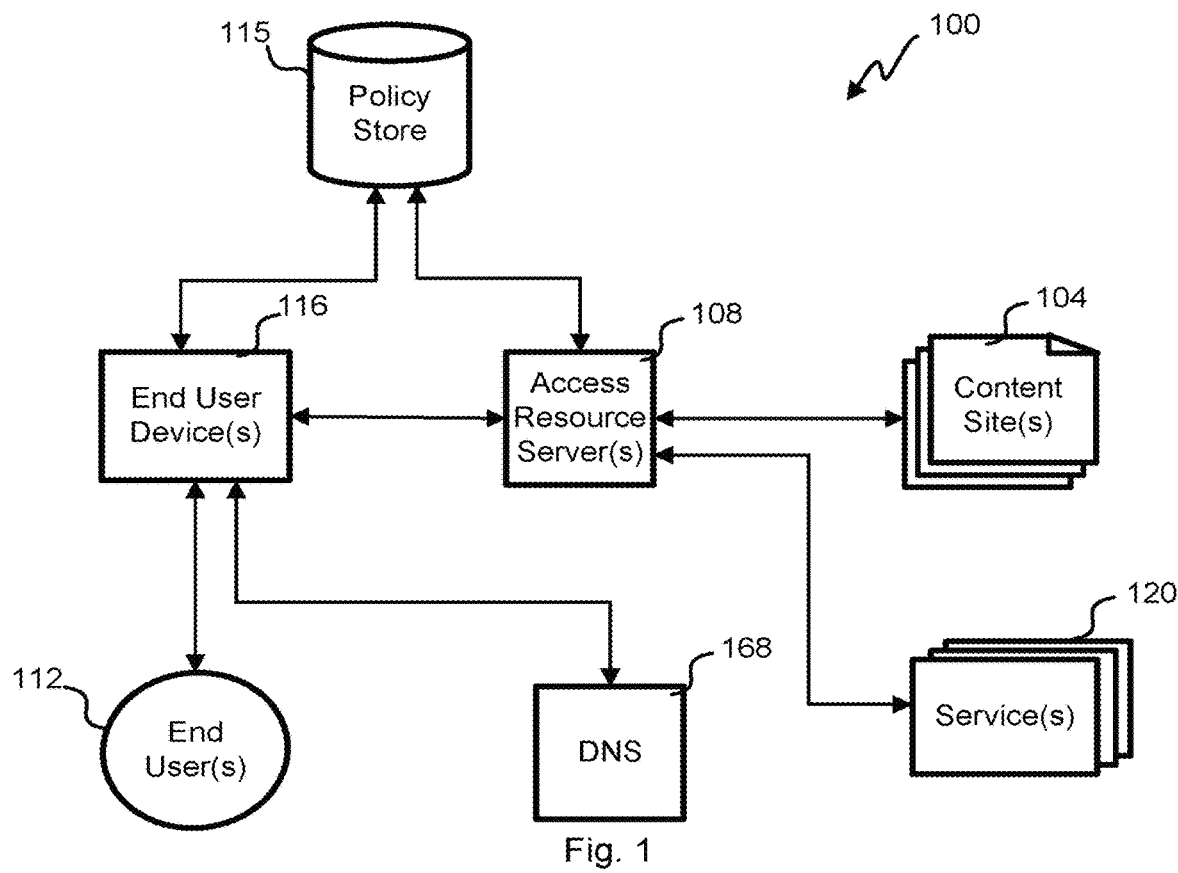
FIG. 1 depicts a block diagram of an embodiment of a controlled content system.

Referring first to FIG. 1 a block diagram of an embodiment of a controlled content system 100 is shown that mediates computing activity of end users 112. End user device(s) 116 such as phones, tablets, PCs, IoT devices, and any other network connected devices that run third party apps can be mediated to using an access resource server (ARS) to control and contain the environment for mediated apps. The third party apps are applications running on the operating system of the end user devices 116. A policy store 115 holds policies for each end user device 116 with a mediated app and each access resource server 108.

The mediated apps and other third party apps use content and processing from content sites 104 (e.g., web sites, streaming content, etc.) and services 120 (e.g., SaaS tools, databases, cloud service providers, etc.). The mediated apps could be any software that runs on the operating system of the end user device (e.g., browser, driver, utility, application, etc.). Mediated apps receive direction from the policy store 115 such as who can use them, what sites and services can they communicate with, what network traffic is routed to the ARS, prohibited network traffic, etc.

Locating content sites 104 and services 120 on the Internet uses domain name services (DNS) 168. The DNS 168 provides IP addresses in response to providing a domain name, for example, a query for acme.com is returned as the 226.204.110.960 IP address. That allows various software on the end user device 116 to find content sites 104 and services 120. DNS acts recursively to pass requests closer to the requesting end user device 116 until an authoritative DNS is found. In this process, traffic and loading can be managed to edge servers that are preferred by the content sites 104 and services 120.

The ARS 108 is also called a mid-link server meaning that for mediated connections, the ARS 108 sits as a "man-in-the-middle" intentionally to mediate some or all content sites 104 and services. Mediated apps direct certain traffic to the ARS 108 for a policy-controlled environment using the policy store 115. For example, content sites 104 can have certain features disabled, filtered or modified by the ARS 108 so that the mediated app behaves differently than if it were to directly connect to the content site 104. Some embodiments have policies that selectively direct traffic to the ARS 108 based upon whether it is done during work hours or not or using a work account or not. For example, in the evenings using a personal Youtube™ account, the end user 112 may have unfettered access with the ability to leave comments on a video. During work hours and/or using a work account, the same end user 112 would be prevented from leaving comments at that same content site 104.

Figure 2A:
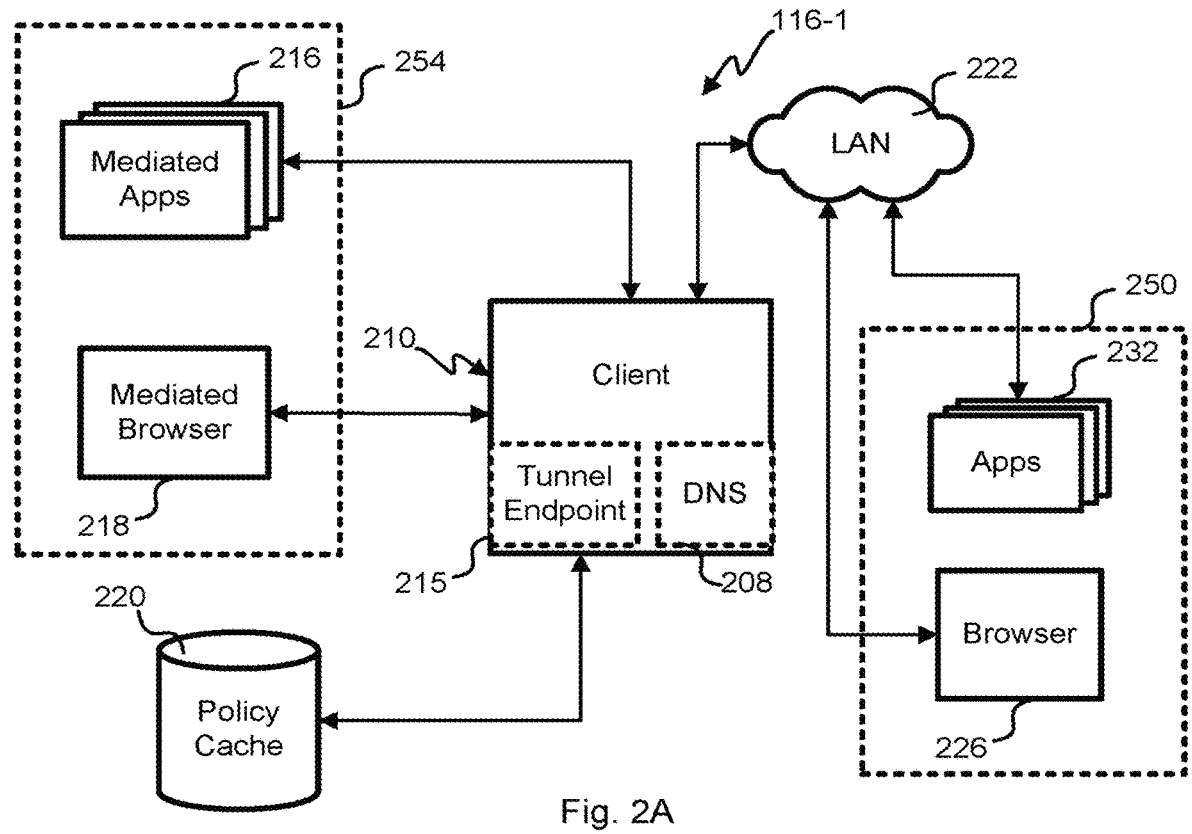
FIGS. 2A-2C depict block diagrams of embodiments of an end user device.
Figure 2B:
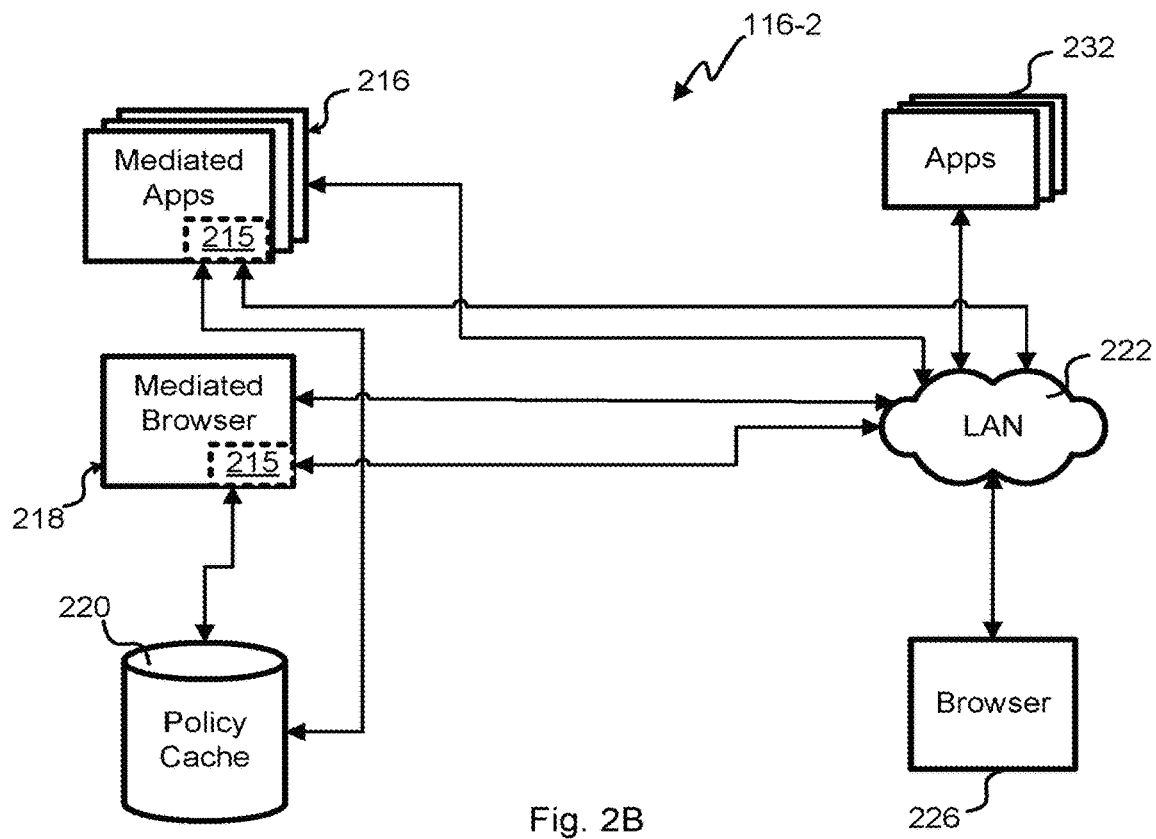
Figure 2C:
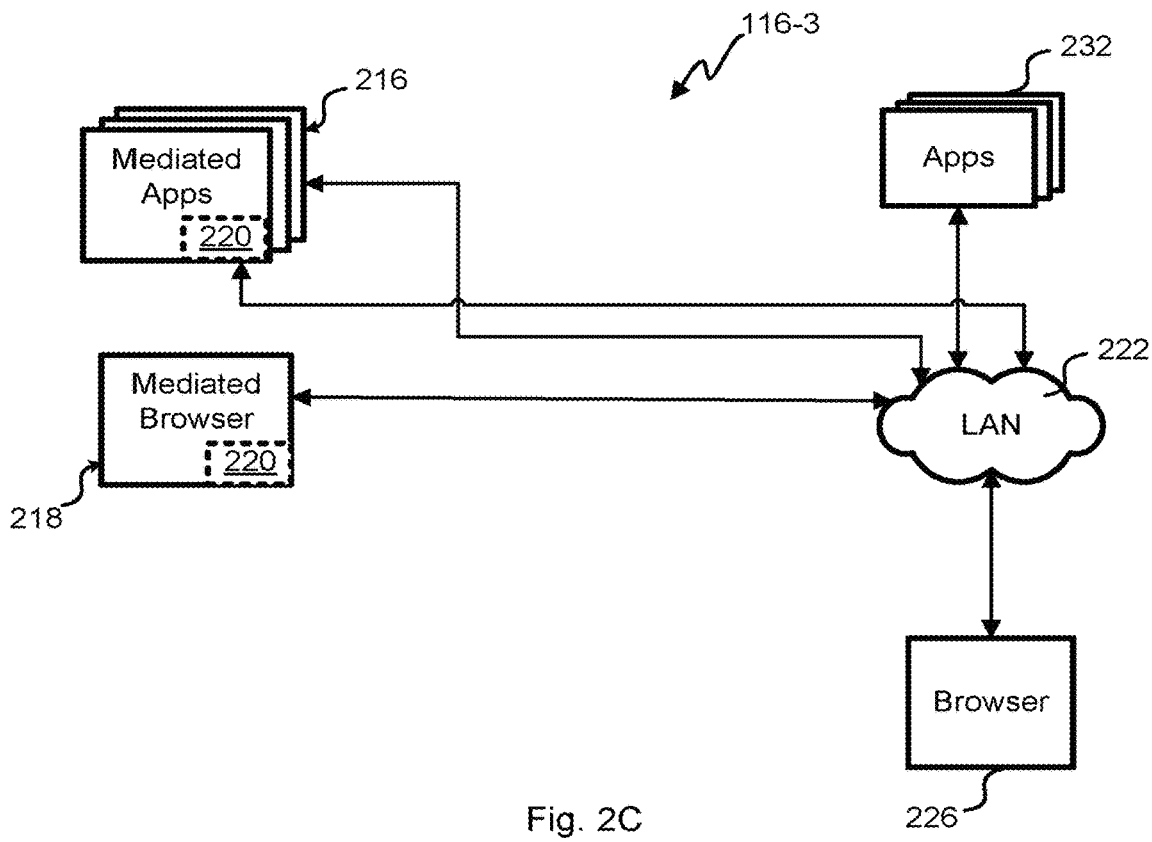

With reference to FIG. 2A-2C, block diagrams of embodiments of an end user device 116 are shown. Mediated apps 216 have varying local and remote control using different mechanisms in the different embodiments. A policy cache 220 holds the subset of policies from the policy store 115 that are intended for the end user device 116. Some embodiments could forgo a policy cache 220 altogether and query a remote policy store 115 as needed in real time.

A local area network (LAN) serves the physical location of the end user device(s) 116 even though that may be temporary and connects to the Internet using a gateway and/or router typically. Some policies from the policy cache 220 may be specific to a particular LAN 222, location, work hours, or other criteria. For example, use of USB drives may be prohibited while connected to the LAN directly or through a VPN to avoid possible theft of trade secrets.

The end user device 116 has a browser 226 and apps 232 that are unmodified programs 250 which are not directly mediated through modification of their code. Some enterprises may not allow download or install of some of these unmodified programs 250 that lack mediation for security and other reasons. A mediated browser 218 and mediated apps 216 are mediated programs 254 installed on the end user device 116 that use the ARS 108 and apply local and/or mid-link policies upon digital packet data traveling within the LAN or externally to the Internet. Some mediated programs 254 are designed with this functionality while others are modified either at compilation and/or run time to allow policy control.

Referring specifically to FIG. 2A, this embodiment of an end user device 116-1 uses a client 210 to assist mediated programs 254 and apply policy control to unmodified programs 250. The client 210 has a DNS 208 that is authoritative for certain unmodified programs 250. The DNS 208 may be part of the operating system in some embodiments. When an unmodified program 250 requests a connection with a content site 104 or service 120 for which there is a policy specifying mediation, the DNS 208 returns an address for the ARS 108 to fulfill the requested interaction. In this way, unmodified programs 250 can be mediated.

The client 210 can apply policies 220 to the end user device 116 in addition to mediating unmodified programs 250. For example, there may be a policy that: requires a recent anti-virus scan prior to allowing connection to the LAN 222, doesn't allow certain programs to be installed, prevents emails to certain address(es), etc.

This embodiment includes an endpoint tunnel 215 in the client 210. The endpoint tunnel 215 digitally separates packet traffic between the end user device 116 and the ARS 108. There may be a number of endpoint tunnels 215 in operation simultaneously for different for different functions or programs 250, 254. A virtual private network (VPN) connection, HTTPS connection (e.g., HTTP 1.0, HTTP 2.0, HTTP 3.0), and/or public or private key encryption can be used for the endpoint tunnel 215 for different connections.

With reference to the embodiment of FIG. 2B, an end user device 116-2 is shown that does not include the client 210 of the embodiment of FIG. 2A. Back to the FIG. 2B embodiment, each of the mediated programs 254 include one or more endpoint tunnels 215 that connect with the ARS 108. The mediated programs 254 also have code to understand policies from the policy cache 220.

Referring next to FIG. 2C, an end user device 116-3 includes mediated programs 254 that have integral policy caches 220. Each policy cache 220 gathers the relevant policies from the policy store 115 Instead of using an endpoint tunnel 215, HTTPS is used to connect the mediated programs 254 to the ARS 108. Some operating systems have HTTPS built directly into them or the code could be included in the mediated program 254. Other embodiments, could use a VPN function in the operating system or built-in for the endpoint tunnel 215 to convey traffic to the ARS 108.

With reference to FIGS. 3A-3E, block diagrams of embodiments of a mediated program 254 are shown. Different mediated programs 254 have different functions and a number of embodiments are detailed in these figures. Generally, there are app functions 318 to implement the various features of the mediated program 254. Typically, there is an interface 104 of some sort to allow end user 112 interaction with the mediated program. A network interface 324 allows communication with the LAN 222 and Internet when so connected.

Figure 3A:
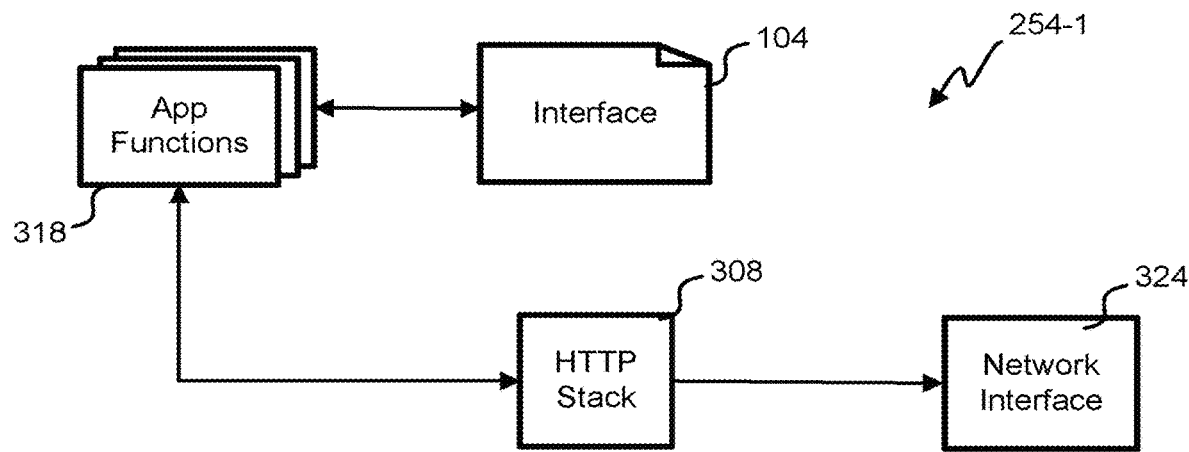
FIGS. 3A-3E depict block diagrams of embodiments of a mediated app.

Referring specifically to FIG. 3A, a mediated program 254-1 is shown that uses a HTTP stack 208 to connect to the ARS 108 for mediated targets. A look-up table or the like indicates when a particular target is mediated or not. For the targets that are not mediated, communication is direct using the HTTP stack 308. The app functions 318 could use the ARS 108 for some communication and not for other communication.

Figure 3B:
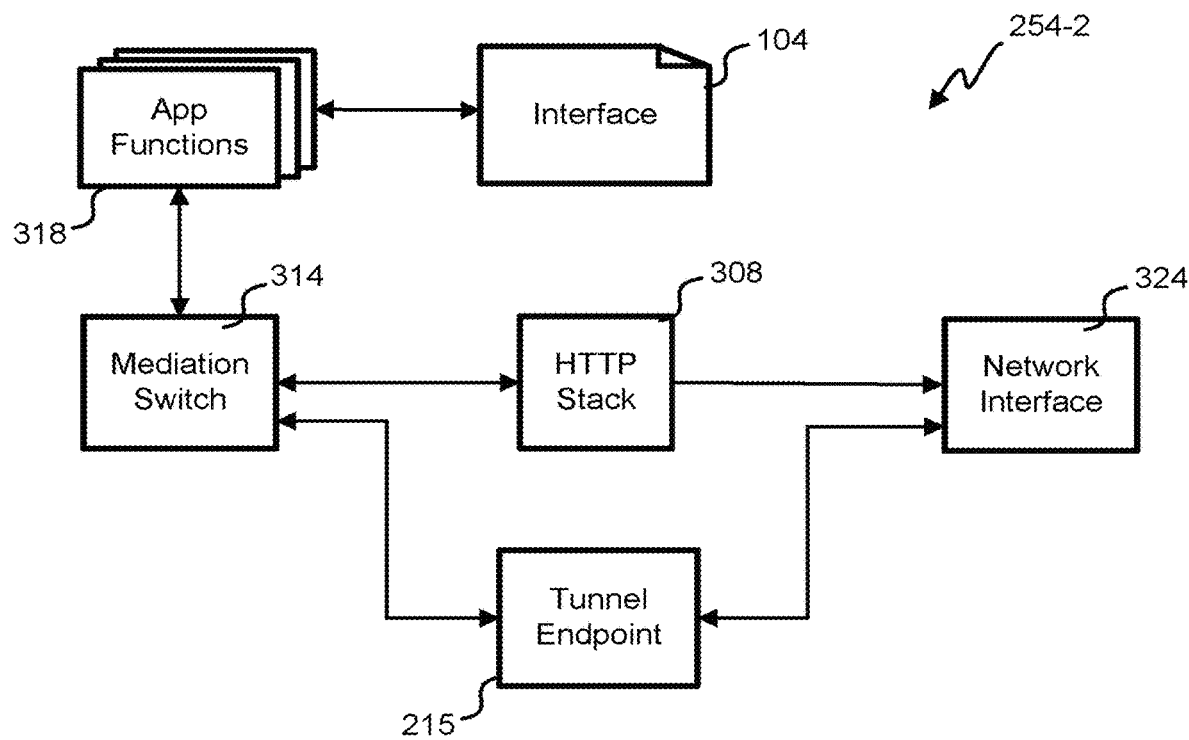

With reference to FIG. 3B, a mediated program 254-2 is shown that includes a mediation switch 314. Mediated targets are directed by the mediation switch 314 to go through the ARS 108 using the tunnel endpoint 215, while the remainder communicate with their target using the HTTP stack 308 without use of the ARS 108. A list of mediated content sites 104 and services 120 is maintained by the app functions and gathered from the policy store 115.

Figure 3C:
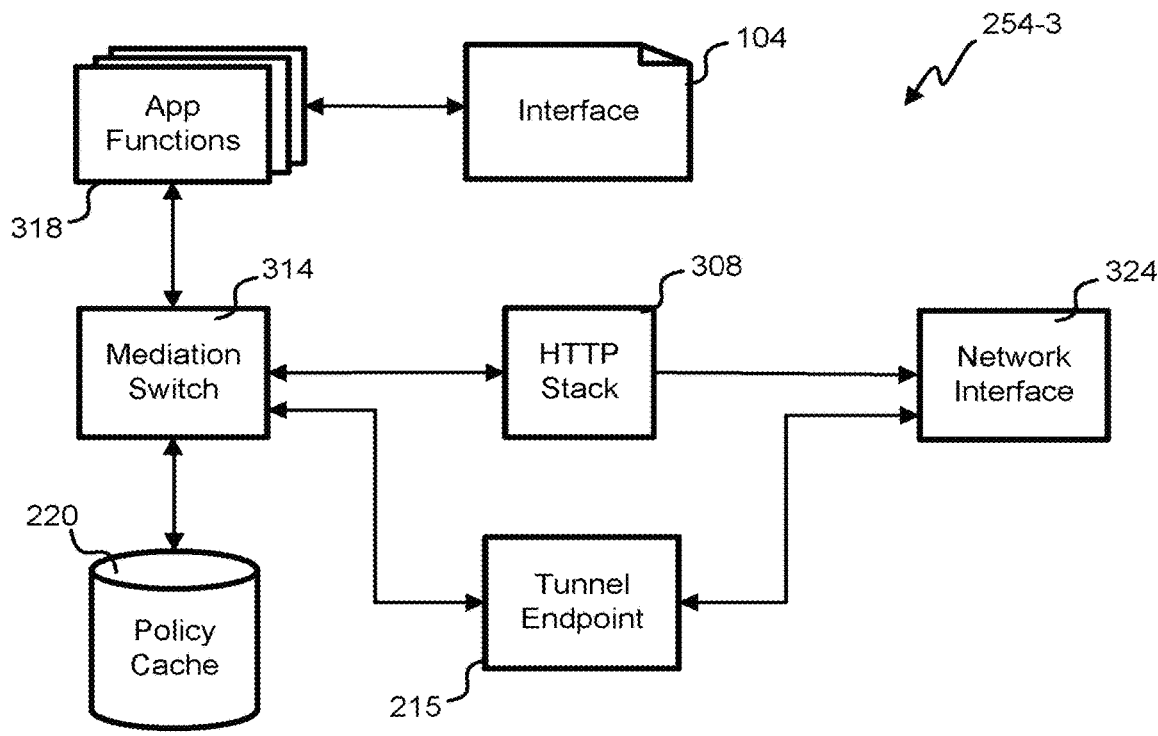

Referring next to FIG. 3C, a mediated program 254-3 is shown that has the mediation switch 314 determine what goes to the ARS 108 using the policy cache 220. The mediation switch can have sophisticated algorithms that determines which traffic is mediated through the ARS 108, for example, time of day, location of the end user device 116, security status of the end user device 116, stability status of the mediated program 254, speed and/or latency of the mediated connection, etc.

Figure 3D:
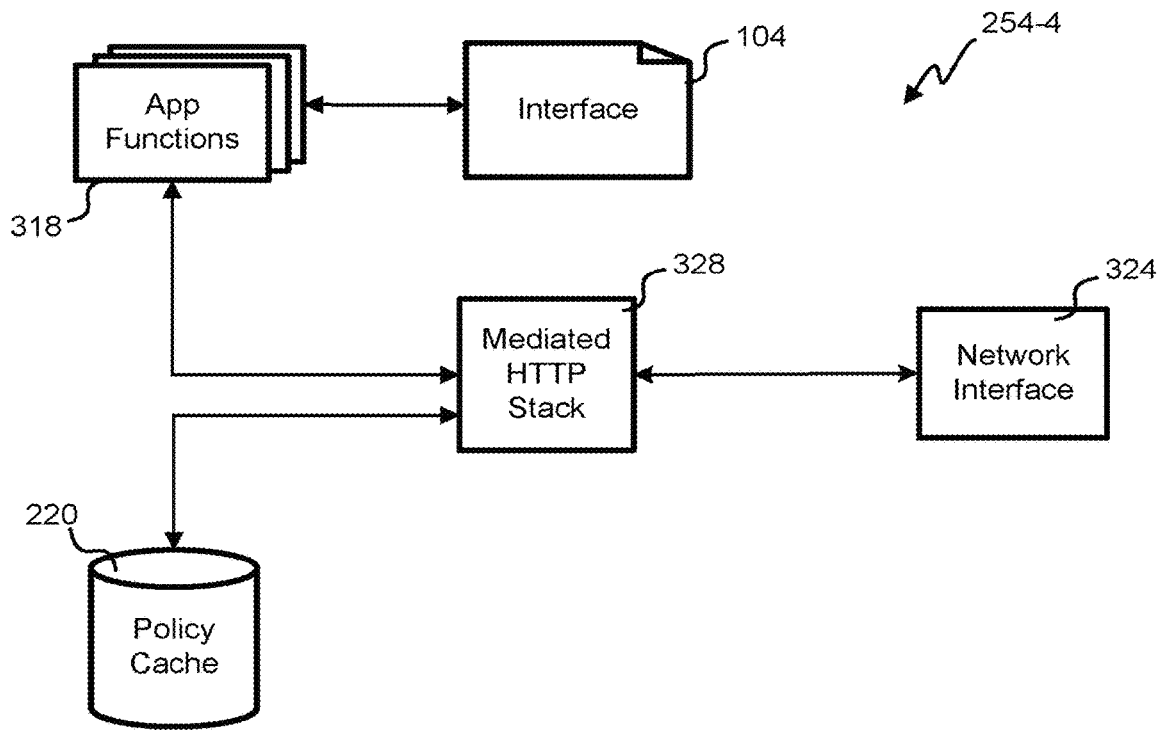

With reference specifically to FIG. 3D, a mediated program 254-4 is shown that determines which traffic goes to the ARS 108 in a mediated HTTP stack 328. The policy cache 220 provides guidance to the mediated HTTP stack 328 so the ARS can be utilized or not. The tunnel endpoint 215 uses HTTPS when communication is with a mediated target. The mediated HTTP stack 328 can use the same API calls as popular open source or proprietary HTTP stacks so that merely switching out that library or those libraries along with adding a policy cache 220 makes existing software capable of leveraging the ARS 108. In some cases, open source versions of software can be converted with little more than substitution and recompiling.

Figure 3E:
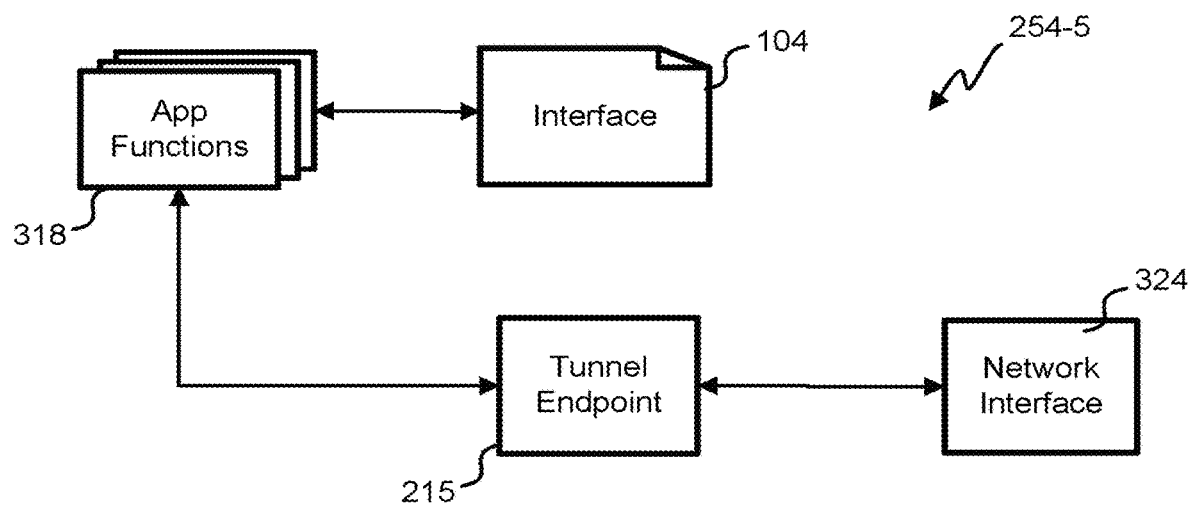

Referring next to FIG. 3E, a mediated program 254-5 is shown that sends all network communication through the tunnel endpoint 215 to the ARS 108. The ARS 108 can decide if a particular target needs mediation or not. The tunnel endpoint 215 could use HTTP or a VPN to connect with the ARS 108. Although the various embodiments of FIGS. 3A-3E have predetermined policies for determining what are mediated targets and the policies to apply, other embodiments could use machine learning to make these determinations. Certain requests for a HTTPS session, for example, might be intercepted and replaced with tunnel endpoint 215 transport to the ARS 108. Observation of what calls result in a HTTP session to which IP addresses could be observed over time to allow intelligent re-routing. The app developer may not cooperate in producing a mediated version of their app 232 and the learning algorithm could intelligently reroute even though not knowing the syntax of an API call initially. That learning could be shared with other instances of the same app 232 to allow diverting more and more traffic over time to the ARS 108 for a policy controlled connection.

Figure 4:
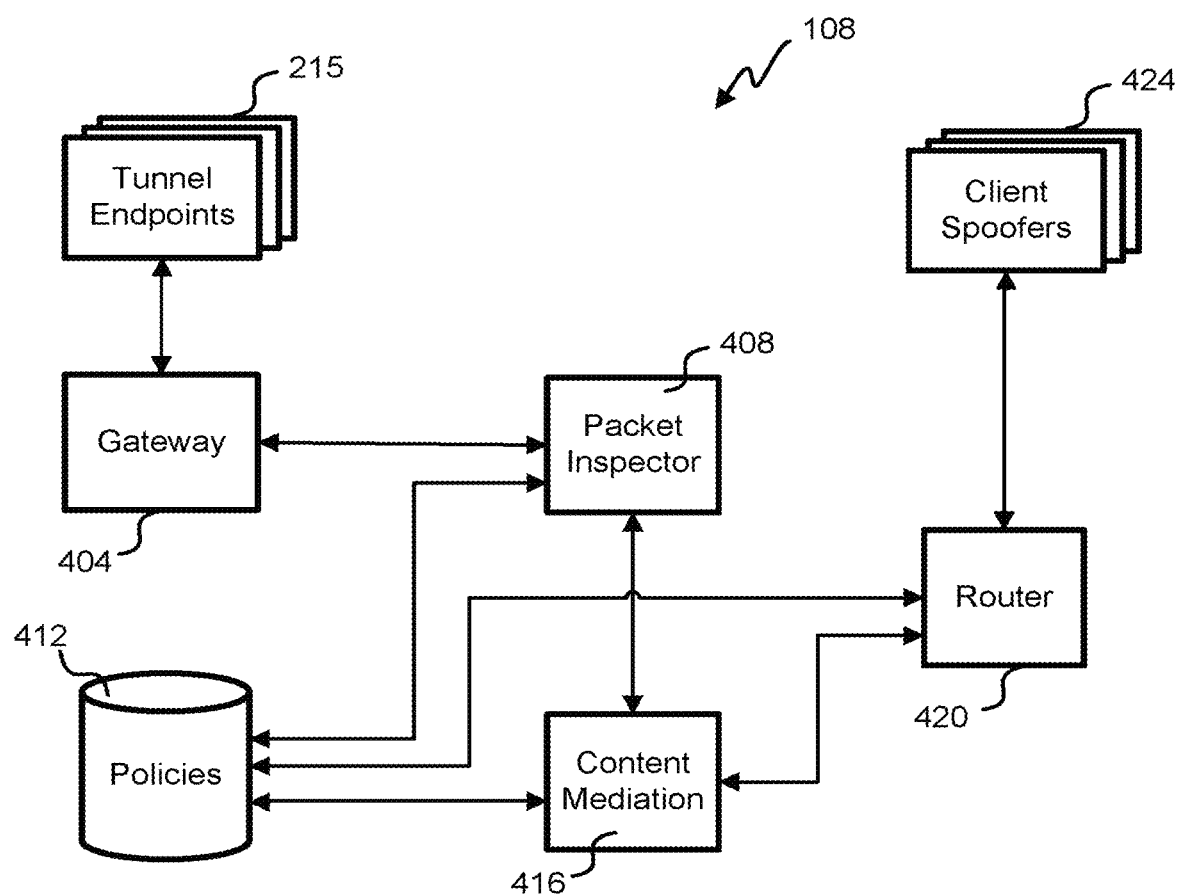
FIG. 4 depicts a block diagram of an embodiment of an access resource server (ARS)

With reference to FIG. 4, a block diagram of an embodiment of an access resource server (ARS) 108 is shown, which is located mid-link in a mediated connection. Different variations of the ARS 108 are described in more detail in U.S. application Ser. No. 16/602,698, filed Nov. 20, 2019, entitled, ZERO TRUST AND ZERO KNOWLEDGE APPLICATION ACCESS SYSTEM, which is hereby incorporated by reference for all purposes. Generally, the ARS 108 spoofs direct interaction with targets as if the end user device 116 was directly interacting. Content sites 104 and services 120 (i.e., targets) generally presume direct interaction with end user devices 116. IP addresses and other information from end user devices 116 are used by targets to localize content, authenticate, or otherwise customize the end user 112 experience.

Tunnel endpoints 215 connect with mediated programs 254 or unmodified programs 250 redirected to the ARS 208. The tunnel endpoints 215 support a number of protocols in various embodiments including HTTP, HTTPS, VPN, and/or encryption. Once the digital packet data is outside the tunnel, it passes through a gateway 404 and to a packet inspector 408. If in plain text, the packet inspector can perform various analysis on the digital packet data to check for nefarious traffic according to the policies 412 gathered from the policy store 115. Each program 250, 254, enterprise, end user device 116 and/or end user 112 may have different policies assigned to its traffic.

Content mediation 416 is also performed according to the relevant policies 412. Mediation may include blocking inappropriate web sites, photos or other content. Portions or features of web sites can be blocked, for example, the ability to post comments. Content mediation 416 can happen in both directions preventing content from being posted to a target, for example. Entire web sites can be rewritten as part of the content mediation to limit functionality and/or access to certain data.

Client spoofers 424 act as though they are the end user device 116 that is directly connecting with a target. The target may use HTTP, HTTPS, VPN, or encrypted connections to the client spoofers 424. Any digital packet from the target can also have content mediation 416 and packet inspection 408 before returning by way of the tunnel endpoints 215. A router 412 connects the ARS to the Internet and ultimately the targets.

Figure 5:
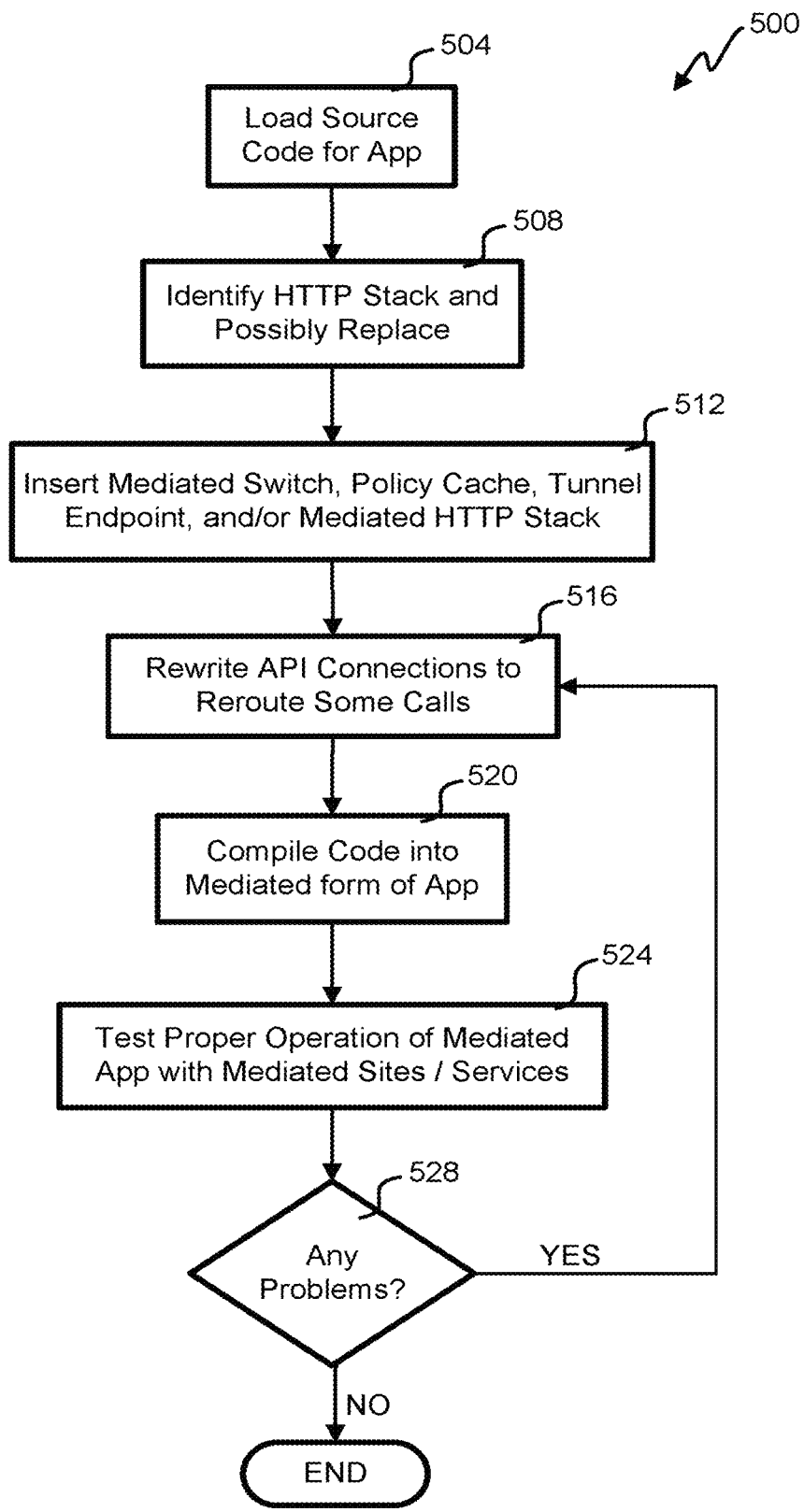
FIG. 5 illustrates a flowchart of an embodiment of a process for converting apps to supporting mediation.

Referring next to FIG. 5, a flowchart of an embodiment of a conversion process 500 for reformulating apps to supporting mediation is shown. Many applications are available in open source form so that this process might convert them to be compatible with the ARS 108 to mediate content. Third party app developers might use this process to add this compatibility too. Without cooperation, a third party app can be compiled with wrapper or shim code that supports the mediation process for controlled targets. Any app with or without cooperation can potentially be recompiled with the wrapper or shim code to support the mediation process.

The depicted portion of the process begins in block 504 where the source code for the app or program is loaded. Depending on the design of the code, the HTTP stack 308 is manually or automatically identified. The HTTP stack 308 can be modified to support the ARS 108 or replaced with a mediated HTTP stack 328. In block 512, other modules or functions can be added to the source code, for example, a mediated switch, policy cache or call to one, a tunnel endpoint, or any of the other blocks shown in FIGS. 3A-3F. Different API connections between modules are rewritten in block 516 to reroute some calls to mediate traffic with targets.

In block 520, the modified code is compiled into a mediated program 254. Testing is performed in block 524. Where there problems, processing looks back to block 516. Otherwise, the mediated program 254 is ready for use. In this way, most unmodified programs 250 can be rewritten into a mediated program 250.

Figure 6A:
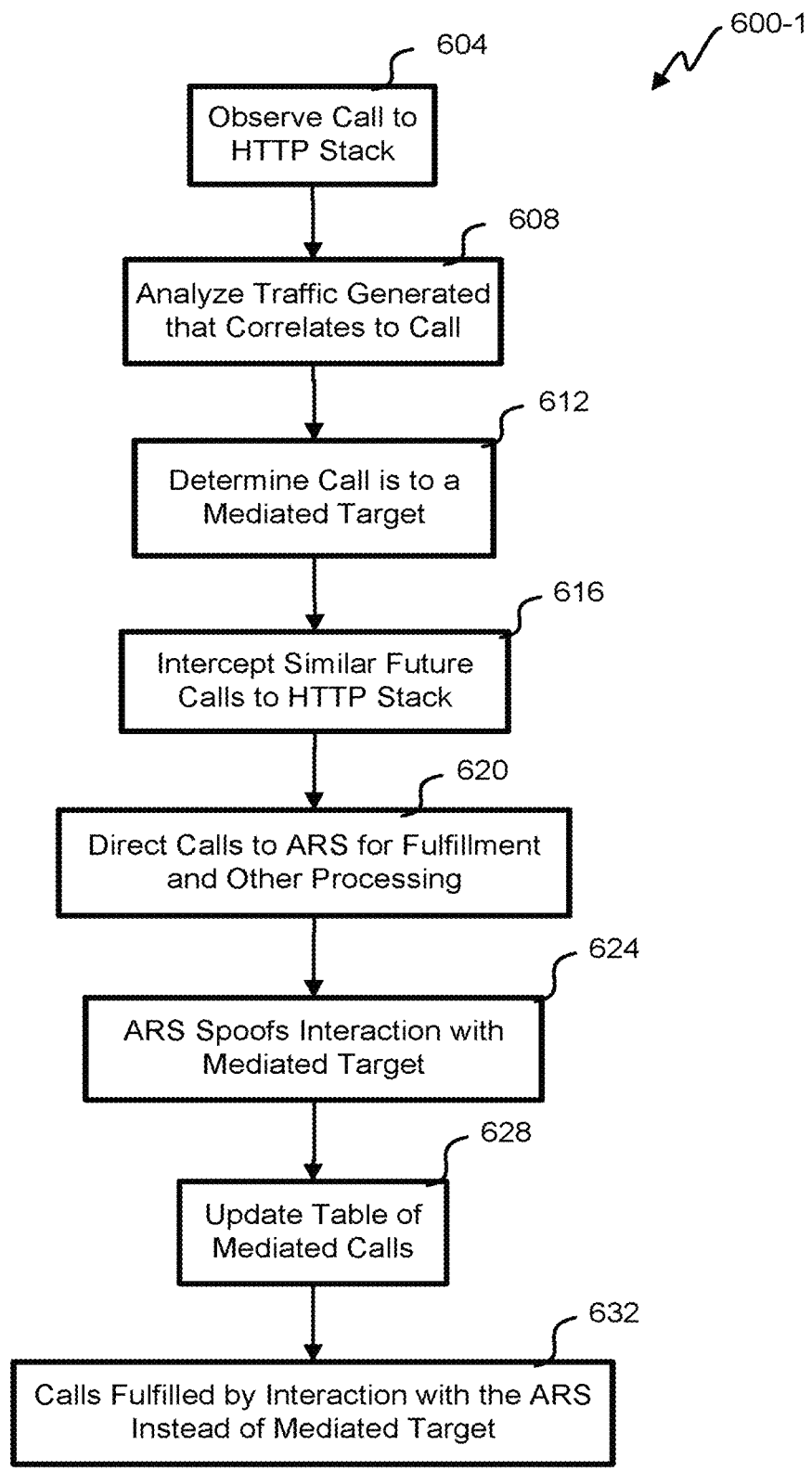
FIGS. 6A-6D illustrate flowcharts of embodiments of a process for processing mediated content with an app.
Figure 6B:
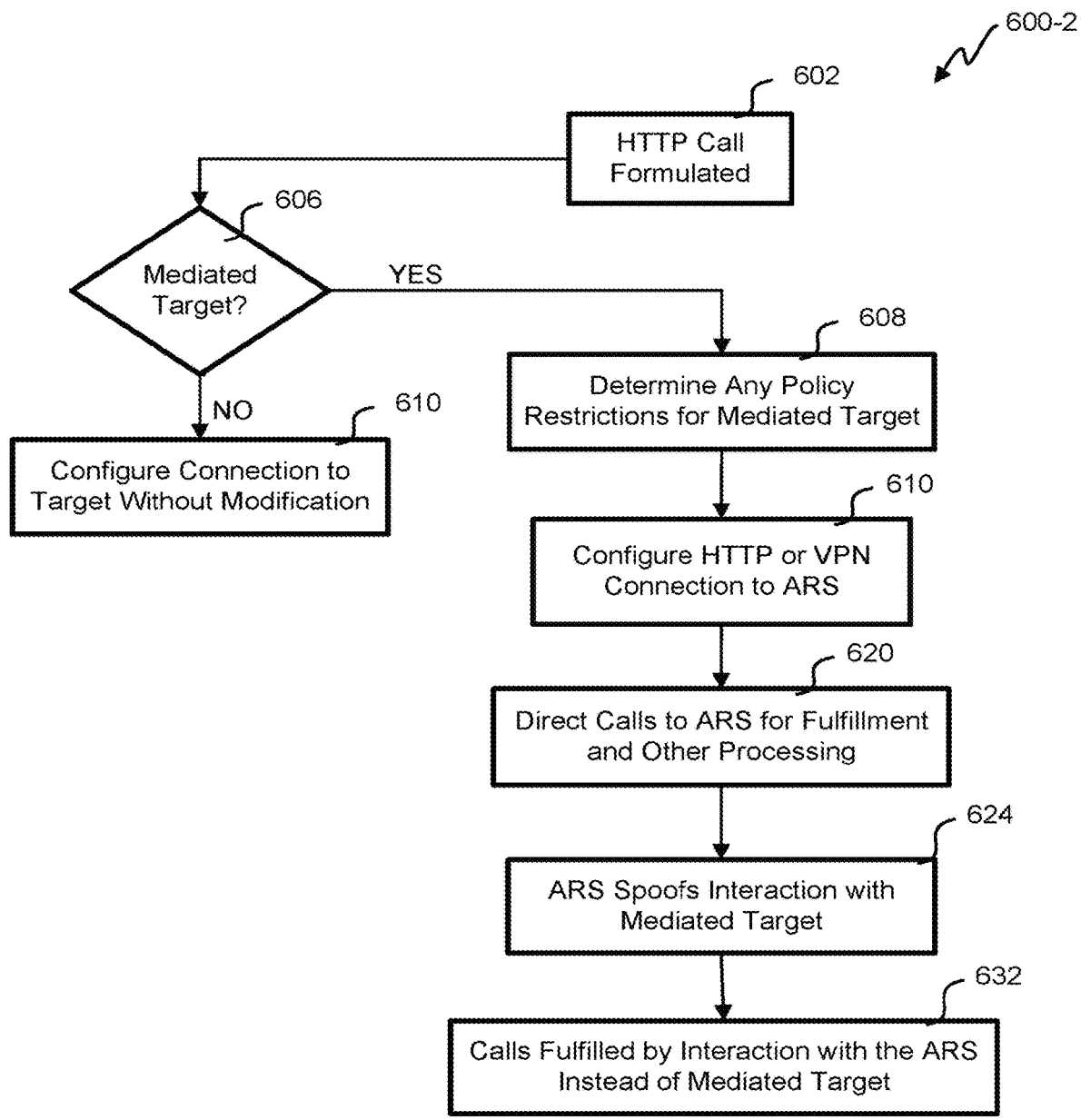
Figure 6C:
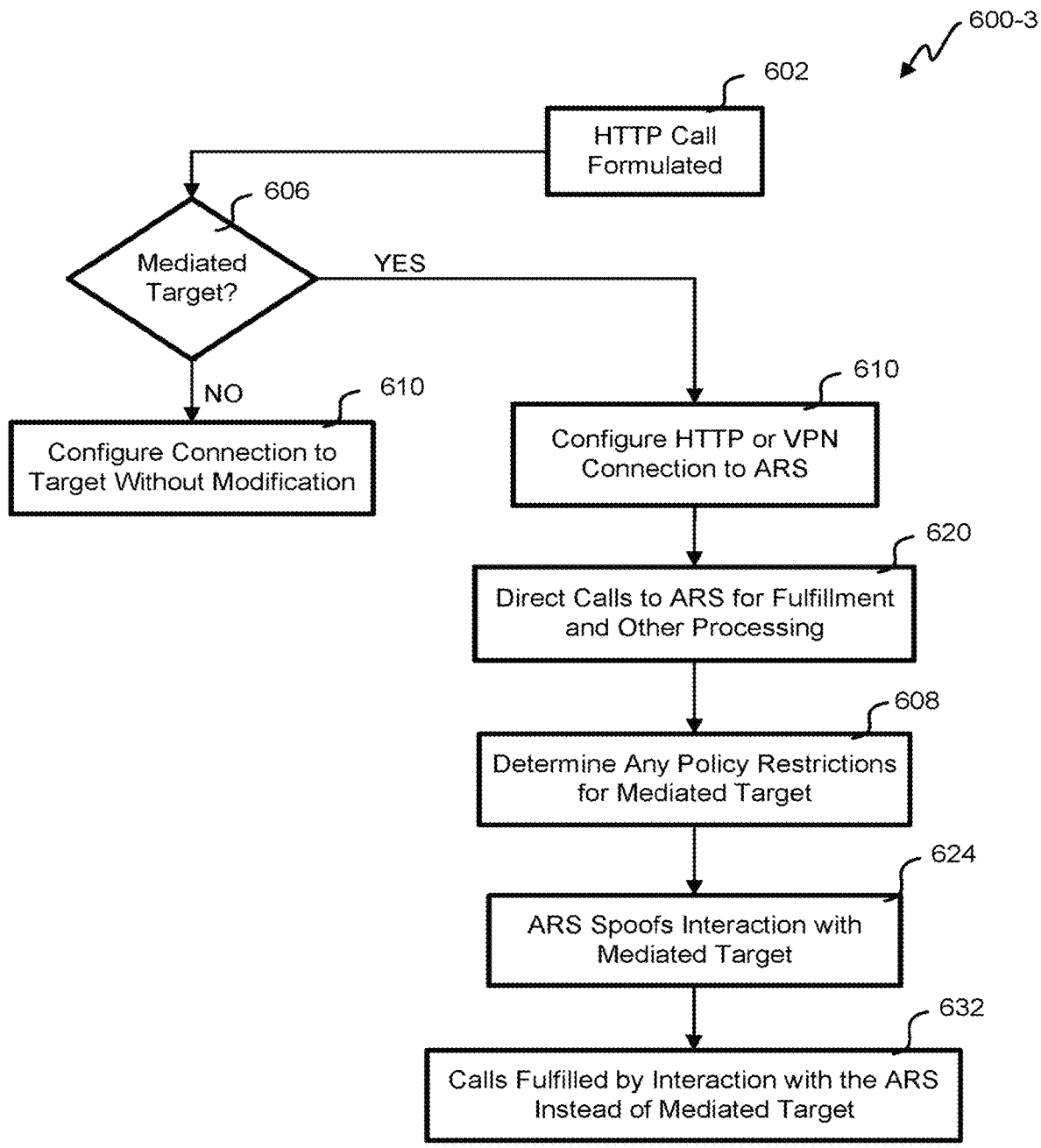

With reference to FIGS. 6A-6C, flowcharts of embodiments of a mediation process 600 for local redirection of mediated interaction with an program 254 are shown. The various embodiments discussed above follow different processes to achieve a controlled and contained environment on the ARS 108 through remote access from the end user device 116.

Referring specifically to FIG. 6A, a flowchart of an embodiment of a mediation process 600-1 is shown. This embodiment uses a wrapper or shim of code that learns over time how to mediate more calls to targets. The unmodified program 250 remains largely unchanged in this embodiment. A machine learning algorithm can make guesses based upon past outcomes to become more accurate over time. The depicted portion of the process beings in block 604, where a call to the HTTP stack 308 is observed by the wrapper. In block 608, the resulting traffic generated from the call is observed, for example, handshaking and IP address.

It is determined in block 612 that the call is to a target that has applicable policies for mediation. Future calls that are similar are intercepted in block 616 and directed to the ARS 108 for fulfillment and other processing specified by the policies in block 620. The ARS 108 spoofs interaction with the mediated target on behalf of the end user device 116. Once an intercepted call is successfully handled once or a number of times, the table of calls to the HTTP stack 308 to intercept is updated in block 628. Those calls in the table are intercepted in the future to go to the ARS 108 rather than the mediated target directly.

With specific reference to FIG. 6B, a flowchart of an embodiment of a mediation process 600-2 is shown. In this embodiment, a mediation switch 314 is used to pass uncontrolled traffic and process mediated traffic through the ARS 108. The depicted portion of the process begins in block 602 where the mediated program 254 formulates a HTTP call after analysis of the relevant policies. For a target that is not subject to mediation as indicted in a policy in block 606, processing continues to block 610 where the HTTP connection between the end user device 116 and the target is configured without the ARS 108 in the middle.

Should the HTTP call be determined in block 606 to be to a mediated target, processing diverts to block 608 where additional policy restrictions are determined for the mediated target and/or other conditions that the policy might depend upon. In block 610, a tunnel endpoint 215 is configured to connect to the ARS 108, for example, a HTTPS or VPN connection. Then processing continues to blocks 620, 624 and 632 in a fashion similar to the embodiment of FIG. 6A.

Referring specifically to FIG. 6C, a flowchart of an embodiment of a mediation process 600-3 is shown. This embodiment applies policy restrictions at the ARS 108 or at least some of them. The handling of connections to targets not being mediated is the same as the embodiment of FIG. 6B. For a mediated target as determined in block 606, processing goes to block 610 where the tunnel to the ARS 108 is configured. In block 620, the calls directed to the ARS are fulfilled and otherwise processed. Any policy restrictions are determined for the mediated target in block 608. Processing continues to blocks 624 and 632 like the prior two embodiments.

Figure 6D:
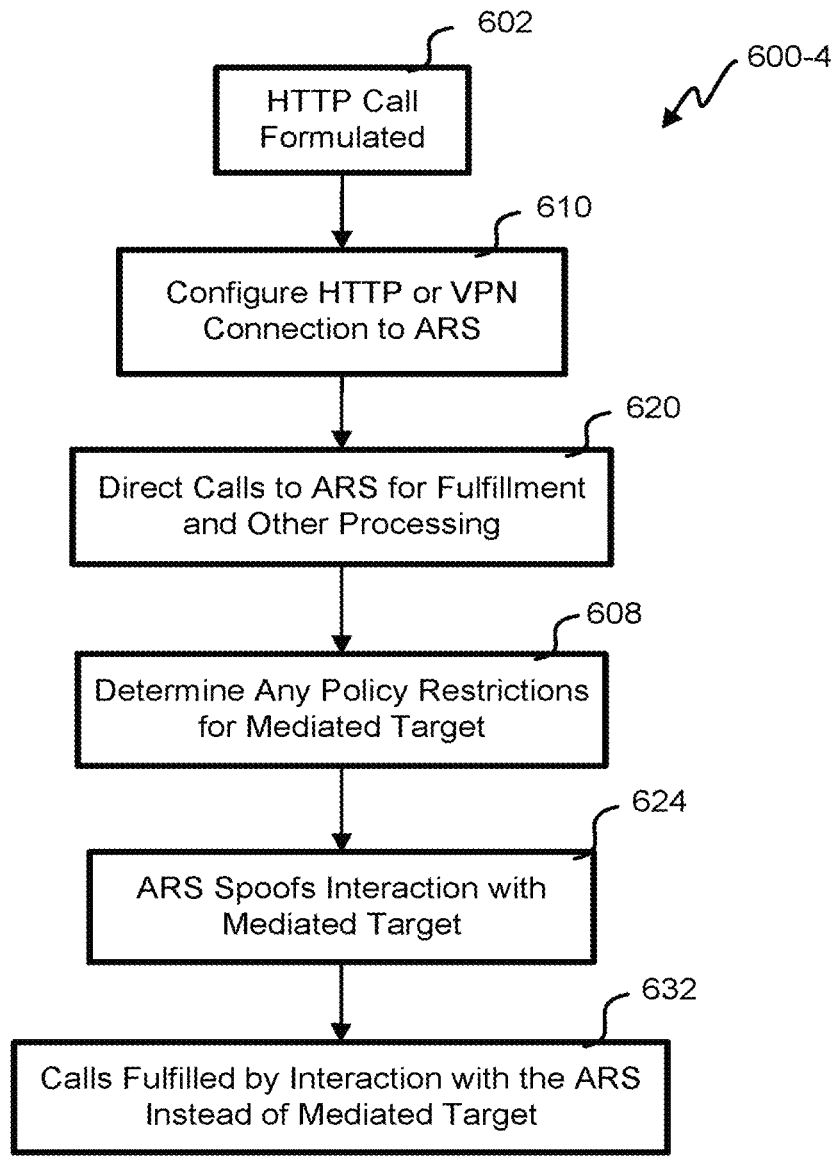

With specific reference to FIG. 6D, a flowchart of an embodiment of a mediation process 600-4 is shown. In this embodiment, all traffic is sent to the ARS 108 for handling. This is true even for an unmediated target. Once the HTTP call is formulated in block 602, the tunnel to the ARS 108 is configured in block 610 to direct all calls to the ARS 108 for processing. Any further policy restrictions are applied in block 608. The ARS 108 spoofs interaction with the mediated target in block 624. Finally, the call is fulfilled by the ARS 108 in block 632. The interaction is portrayed on the mediated program 254 as if it were performed by the end user device 116 alone.

A number of variations and modifications of the disclosed embodiments can also be used. For example, the above embodiments modify code to create a mediated program 254, other embodiments could modify the HTTP stack and/or VPN functionality in the operating system. Policy controlled traffic could be diverted by the operating system to the ARS 108.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

I claim:

1. A controlled content system for providing policy-controlled communication over the Internet between a third-party application executing on an end user device and a plurality of remote services, the controlled content system comprising:

the third-party application configured to execute on the end user device, the third-party application comprising:
a first policy component with a first plurality of policies for network packet traffic for the third-party application, wherein the first plurality of policies specify one or more aspects of processing of network sessions from the third-party application to the plurality of remote services,
a client endpoint coupled to a digitally protected tunnel,
an interceptor component that identifies the network packet traffic according to the first plurality of policies, wherein the network packet traffic is diverted to the client endpoint for transport over the digitally protected tunnel;
a policy cache to store the first plurality of policies, wherein the first plurality of policies modifies software operation for a wrapper in real time according to any updates to the first plurality of policies, wherein the third-party application is modified during compilation by incorporating the wrapper,
a mediated program of the third-party application that applies a set of policies on the network packet traffic, wherein the set of policies include the first plurality of policies and a second plurality of policies, and
a mediation switch of the mediated program determines whether the network packet traffic is mediated through a mid-link server using the policy cache, and the mediation switch includes algorithms that determines the network packet traffic mediated through the mid-link server based on one or more parameters; and the mid-link server coupled to the digitally protected tunnel, the mid-link server comprising:
a mid-link endpoint that terminates the digitally protected tunnel,
a second policy component, wherein the second policy component uses the second plurality of policies to specify at least: policy-based routing, packet readdressing, and content mediation rules to block the end user device from accessing content portions of the network packet traffic identified by the interceptor component, the network packet traffic arriving from the digitally protected tunnel,
a router component interposed between the digitally protected tunnel and the plurality of remote services, wherein the router component operates to route the network packet traffic between the digitally protected tunnel and the plurality of remote services via a route specified by the second plurality of policies, and
an inspection component that analyzes the network packet traffic in accordance with the second plurality of policies, wherein the third-party application operates with the plurality of remote services to provide functionality to the end user device.

2. The controlled content system for providing policy-controlled communication over the Internet between a third-party application executing on an end user device and a plurality of remote services of claim 1, wherein the one or more parameters include a time of day, a location of the end user device, a security status of the end user device, a stability status of the mediated program, a speed and/or a latency of a mediated connection.

3. The controlled content system for providing policy-controlled communication over the Internet between a third-party application executing on an end user device and a plurality of remote services of claim 1, wherein the third-party application is a web browser, and the plurality of remote services are a plurality of web sites.

4. The controlled content system for providing policy-controlled communication over the Internet between a third-party application executing on an end user device and a plurality of remote services of claim 1, wherein the mid-link server further comprises a mediation component that performs content mediation based on the second plurality of policies.

5. The controlled content system for providing policy-controlled communication over the Internet between a third-party application executing on an end user device and a plurality of remote services of claim 1, wherein the digitally protected tunnel is a virtual private network (VPN) connection.

6. The controlled content system for providing policy-controlled communication over the Internet between a third-party application executing on an end user device and a plurality of remote services of claim 1, wherein the digitally protected tunnel is one of a Hypertext Transfer Protocol Secure (HTTPS) or Hypertext Transfer Protocol (HTTP) session.

7. A method for providing policy-controlled communication over the Internet between a third-party application executing on an end user device and a plurality of remote services, the method comprising:
configuring the third-party application to execute on the end user device, wherein the third-party application comprises a first policy component, a client endpoint, an interceptor component, a policy cache, a mediated program and a mediation switch;
specifying one or more aspects of processing of network sessions from the third-party application to the plurality of remote services according to a first plurality of policies for network packet traffic for the first policy component of the third-party application;
identifying with the interceptor component the network packet traffic according to the first plurality of policies, wherein the network packet traffic is diverted to the client endpoint for transport over a digitally protected tunnel;
storing the first plurality of policies by the policy cache;
modifying software operation for a wrapper in real time according to any updates to the first plurality of policies, wherein the third-party application is modified during compilation by incorporating the wrapper;
applying a set of policies by the mediated program of the third-party application on the network packet traffic, wherein the set of policies include the first plurality of policies and a second plurality of policies;

determining by the mediation switch of the mediated program whether the network packet traffic is mediated through a mid-link server using the policy cache, and the mediation switch includes algorithms that determines the network packet traffic mediated through the mid-link server based on one or more parameters;

coupling the mid-link server to the digitally protected tunnel, wherein the mid-link server comprises a mid-link endpoint, a second policy component, a router component and an inspection component;

terminating the digitally protected tunnel with the mid-link endpoint;

specifying by the second policy component, at least: policy-based routing, packet re-addressing, and content mediation rules to block the end user device from accessing content portions of the network packet traffic identified by the interceptor component, the network packet traffic arriving from the digitally protected tunnel;

routing, with the router component interposed between the digitally protected tunnel and the plurality of remote services, the network packet traffic between the digitally protected tunnel and the plurality of remote services via a route specified by the second plurality of policies; and analyzing the network packet traffic with the inspection component in accordance with the second plurality of policies, wherein the third-party application operates with the plurality of remote services to provide functionality to the end user device.

8. The method for providing policy-controlled communication over the Internet between a third-party application executing on an end user device and a plurality of remote services of claim 7, wherein the one or more parameters include a time of day, a location of the end user device, a security status of the end user device, a stability status of the mediated program, a speed and/or a latency of a mediated connection.

9. The method for providing policy-controlled communication over the Internet between a third-party application executing on an end user device and a plurality of remote services of claim 7, wherein the third-party application is a web browser, and the plurality of remote services are a plurality of web sites.

10. The method for providing policy-controlled communication over the Internet between a third-party application executing on an end user device and a plurality of remote services of claim 7, wherein the mid-link server further comprises a mediation component that performs content mediation based on the second plurality of policies.

11. The method for providing policy-controlled communication over the Internet between a third-party application executing on an end user device and a plurality of remote services of claim 7, wherein the digitally protected tunnel is a virtual private network (VPN) connection.

12. The method for providing policy-controlled communication over the Internet between a third-party application executing on an end user device and a plurality of remote services of claim 7, wherein the digitally protected tunnel is one of a Hypertext Transfer Protocol Secure (HTTPS) session or Hypertext Transfer Protocol (HTTP) session.

13. A controlled content system for providing policy-controlled communication over the Internet between a third-party application executing on an end user device and a plurality of remote services, the controlled content system comprising a plurality of processors and memories with code for:

configuring the third-party application to execute on the end user device, wherein the third-party application comprises a first policy component, a client endpoint, an interceptor component, a policy cache, a mediated program and a mediation switch;

specifying one or more aspects of processing of network sessions from the third-party application to the plurality of remote services according to a first plurality of policies for network packet traffic for the first policy component of the third-party application;

identifying with the interceptor component the network packet traffic according to the first plurality of policies, wherein the network packet traffic is diverted to the client endpoint for transport over a digitally protected tunnel;

storing the first plurality of policies by the policy cache;

modifying software operation for a wrapper in real time according to any updates to the first plurality of policies, wherein the third-party application is modified during compilation by incorporating the wrapper;

applying a set of policies by the mediated program of the third-party application on the network packet traffic, wherein the set of policies include the first plurality of policies and a second plurality of policies;

determining by the mediation switch of the mediated program whether the network packet traffic is mediated through a mid-link server using the policy cache, and the mediation switch includes algorithms that determines the network packet traffic mediated through the mid-link server based on one or more parameters;

coupling the mid-link server to the digitally protected tunnel, wherein the mid-link server comprises a mid-link endpoint, a second policy component, a router component and an inspection component;

terminating the digitally protected tunnel with the mid-link endpoint;

specifying by the second policy component, at least: policy-based routing, packet re-addressing, and content mediation rules to block the end user device from accessing content portions of the network packet traffic identified by the interceptor component, the network packet traffic arriving from the digitally protected tunnel;

routing, with the router component interposed between the digitally protected tunnel and the plurality of remote services, the network packet traffic between the digitally protected tunnel and the plurality of remote services via a route specified by the second plurality of policies; and analyzing the network packet traffic with the inspection component in accordance with the second plurality of policies, wherein the third-party application operates with the plurality of remote services to provide functionality to the end user device.

14. The controlled content system for providing policy-controlled communication over the Internet between a third-party application executing on an end user device and a plurality of remote services of claim 13, wherein the one or more parameters include a time of day, a location of the end user device, a security status of the end user device, a stability status of the mediated program, a speed and/or a latency of a mediated connection.

15. The controlled content system for providing policy-controlled communication over the Internet between a third-party application executing on an end user device and a plurality of remote services of claim 13, wherein the third-party application is a web browser, and the plurality of remote services are a plurality of web sites.

16. The controlled content system for providing policy-controlled communication over the Internet between a third-party application executing on an end user device and a plurality of remote services of claim 13, wherein the mid-link server further comprises a mediation component that performs content mediation based on the second plurality of policies.

17. The controlled content system for providing policy-controlled communication over the Internet between a third-party application executing on an end user device and a plurality of remote services of claim 13, wherein the digitally protected tunnel is one of a virtual private network (VPN) connection or a Hypertext Transfer Protocol Secure (HTTPS) session or a Hypertext Transfer Protocol (HTTP) session.

\* \* \* \* \*